United States Patent Office 3,148,910
Patented Sept. 15, 1964

3,148,910
DEVICE FOR RECONDITIONING THE FLANGED TIRES OF WHEELS OF RAILWAY ROLLING STOCK
Guy Valleteau de Moulliac, Paris, France, assignor to Societe Generale "Isothermos," Société Anonyme, Paris, France
Filed Nov. 27, 1962, Ser. No. 240,317
Claims priority, application France, Nov. 27, 1961, 880,143, Patent 1,314,463
6 Claims. (Cl. 295—1)

This invention relates in general to means for reconditioning flanged tires of railway rolling stock wheels and has specific reference to an arrangement designed for simplifying the tire reconditioning operations.

It is known that the tires of wheels of railway rolling stock in general must be reconditioned or reshaped periodically, and since the time period elapsing between two successive tire reconditioning operations is frequently shorter than the time period running between two successive axle-box maintenance operations, it is advantageous, in order to avoid the risk of introducing foreign matters such as chips or dust into the axle-boxes, as this is most likely to damage the rollers or bearings according to the type of box, to carry out this reconditioning step without removing or opening the axle-boxes.

Two methods are now chiefly resorted to for the routine reconditioning of flanged tires of wheels of railway rolling stock, i.e.:

(1) According to a first method, the outer face of the axle-box comprises an integral boss incorporating a tapped bearing engageable by a screw plug.

Before reconditioning the tire, this screw plug is removed and the lathe centre engaged through this aperture, so that it is centred relative to the axle, the diameter of this aperture being greater than that of the lathe-center to permit the proper positioning of the latter.

This operation is not completely reliable in that foreign matter usually penetrates into the axle-box body, with the consequent risk of damaging sooner or later the bearing elements, which may be extremely serious in some cases.

(2) According to another method, this last-named inconvenience is avoided by securing externally of the axle-box a cover formed with a central hole engageable by the lathe-center before commencing the reconditioning operation proper.

In this specific mounting the axes of the centering cover and of the axle must be perfectly coincident. Now this coincidence is practically unattainable with the desired precision when assembling on the spindle the various component elements such as axle-box body, bearings, cover, etc.

It is the essential object of this invention to provide an arrangement which combines the advantages of the two methods set forth hereinabove while avoiding their drawbacks.

To this end, the spindle proper or its abutment head receives on its outer end a cylindrical extension opening into the inner cavity of the axle-box cover.

The front face of this extension is formed with a properly machined centering hole of a size sufficient to permit the mounting of the complete axle on a wheel reconditioning lathe, for example between the lathe-centers thereof.

Thus, the centering step can be accomplished directly without removing the axle-boxes and without leaving any gap or play through which dust or chips might penetrate into the axle-box.

Conventional packing means may be provided between the edges of the cover and the spindle extension members.

Another detachable cover made of pressed metal sheet or even plastic material is secured on the former. Its purpose is to ensure a mechanical protection of the centering which must remain geometrically perfect, and also to complete the front sealing which is another requirement of the axle-box.

With the foregoing and other objects in view, the invention resides in the novel arrangement and combination of parts and in the details of construction hereinafter described and claimed, it being understood that changes in the precise embodiments of the invention herein disclosed may be made within the scope of what is claimed without departing from the spirit of the invention.

Other objects and advantages will become apparent from the following description taken in conjunction with the accompanying drawings, in which.

Figure 1:
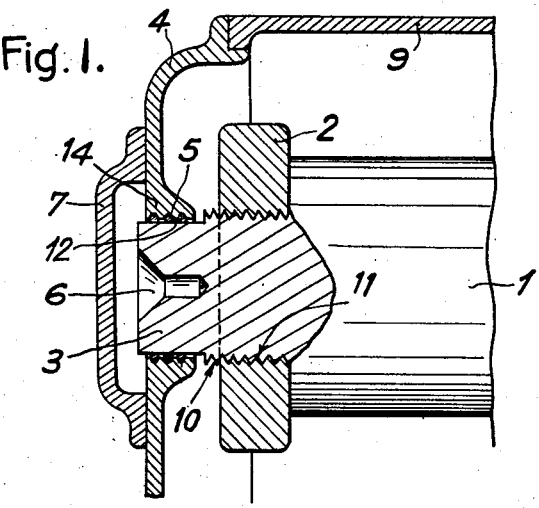
FIGURE 1 is a vertical axial section showing a first form of embodiment of an axle-box constructed according to the teachings of this invention.
Figure 2:
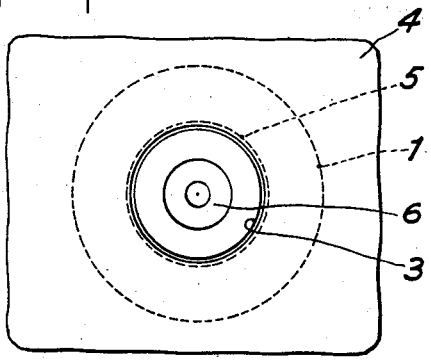
FIGURE 2 is a fragmentary end view of the structure shown in FIG. 1, the secondary or outer cover being removed.

In the mounting according to this invention, as illustrated in the form of embodiment of FIGS. 1 and 2, the spindle 1 comprises an extension in the form of a cylindrical journal portion 3 projecting slightly beyond the plane of the axle-box cover 4, the central aperture of this cover acting as a bearing 14 to this journal portion 3, adequate sealing means such as baffles, resilient shaft packings 5, etc. being interposed therebetween, as shown.

The front face of said journal portion 3 has machined in its center a hole 6 permitting the introduction of a lathe-center 15 therein.

Another detachable cover or lid 7 is secured on the main cover 4 for protecting the centering and complete the sealing thereof against the ingress of dust and foreign matter.

The cylindrical journal portion 3 may be threaded as at 10 for receiving a tapped hole 11 of abutment head 2 or if desired of spindle 1, this journal constituting the centering portion of spindle 1 in bearing 14.

Figure 3:
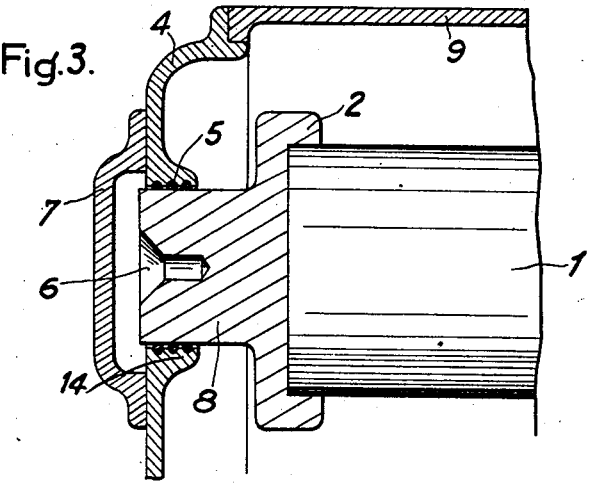
FIGURE 3 is a view similar to FIG. 1 but showing a modified embodiment.

In the alternate form of embodiment illustrated in FIG. 3, the axle extension consists of a cylindrical projection 8 formed integrally with the abutment head 2 which extends as in the preceding case through the bearing 14 formed centrally of the cover 4 of the axle-box 9.

In either form of embodiment, it is the center of axle 1 or of its extension 3 that receives directly the lathe-center 15.

Under these conditions, any possibility of misalignment is definitely precluded.

No foreign substance can penetrate into the axle-box 9, the joint between the spindle extension and the axle-box being sealed by conventional packing means 5, between the cover 7 and the plain portion 12 of the journal portion 3.

Thus, when the protection cover 7 is removed prior to commencing the wheel tire reconditioning operation the axle-box is not exposed directly to the penetration of dust or foreign matters from the outside. Thus, the bearing component elements, or the shells, are efficiently protected against the ingress of foreign substances and notably of metal particles cut during the turning of the tires, without necessitating any particular care.

Although the present invention has been described in conjunction with preferred embodiments, it is to be understood that modifications and variations may be resorted to without departing from the spirit and scope of the invention as those skilled in the art will readily understand.

Such modifications and variations are considered to be within the purview and scope of the invention and appended claims.

What I claim is:

1. An axle-box permitting without any disassembling step the reconditioning of the flanged tires of the wheels of railway rolling stock, which comprises an end cover in which an axial bearing-forming hole is bored, packing means in said bearing, a spindle, a spindle abutment head endwise of said spindle which has a tapped hole formed therein along its axis, a cylindrical outer extension of said spindle, a threaded portion of said extension which engages the tapped hole of said spindle head, a plain portion of said extension which engages said box cover bearing, and a hole machined centrally of the front face of said bearing-forming portion to permit the direct mounting of said axle-box on a centering lathe.

2. An axle-box permitting without any disassembling step the reconditioning of the flanged tires of the wheels of railway rolling stock, which comprises an end cover in which an axial bearing-forming hole is bored, packing means in said bearing, a spindle, a spindle abutment head endwise of said spindle which has a tapped hole formed therein along its axis, a cylindrical outer extension of said spindle, a threaded portion of said extension which engages the tapped hole of said spindle head, a plain portion of said extension which engages said box cover bearing, a hole machined centrally of the front face of said bearing-forming portion to permit the direct mounting of said axle-box on a centering lathe, and a complementary cover secured on said axle-box cover in front of said spindle extension.

3. In a railway axle box assembly permitting without any disassembling the reconditioning of the flanged tires of the wheels of railway rolling stock, the combination of a stationary axle box having an outer end cover, a wheel axle spindle rotatably journaled in said axle box, said end cover having a bearing-forming hole in axial alignment with said spindle, a rigid axial extension on said spindle extending through said hole and having in its outer end a central hole adapted to receive a lathe-center, means providing an annular seal between the periphery of said hole in said cover and said spindle extension, and a supplemental cover secured on said outer end cover and enclosing the outer end of said spindle extension.

4. In a railway axle box assembly, permitting the reconditioning of the flanged wheels of railway rolling stock without disassembly, the combination of a stationary axle box having an outer end cover, a wheel axle spindle rotatably journaled in said axle box, said end cover having a hole in axial alignment with said spindle, a reduced axial extension on said spindle extending through said hole and having in its outer end a central hole adapted to receive a lathe-center, means providing an annular seal between the periphery of said hole in said end cover and said spindle extension, and a supplemental cover secured on said outer end cover and enclosing the outer end of said spindle extension.

5. The combination as claimed in claim 4, in which said spindle extension is integral with an abutment head receiving the end of said axle spindle and rigidly secures thereto.

6. In a railway axle box assembly permitting the reconditioning of the flanged wheels of railway rolling stock on a lathe without disassembly, the combination of a stationary axle box having an outer end cover, a wheel axle spindle rotatably journaled in said axle box, said end cover having a hole in axial alignment with said spindle, an abutment head on said spindle, a reduced axial spindle extension projecting rigidly from said abutment head and received in said hole, said spindle extension having in its outer end a central hole adapted to receive a lathe-center, means providing an annular seal between the periphery of said hole in said end cover and said spindle extension and a supplemental cover secured on said outer end cover and enclosing the outer end of said spindle extension.

References Cited in the file of this patent

UNITED STATES PATENTS

| | | |
|---|---|---|
| 2,099,822 | Oelkers | Nov. 23, 1937 |
| 2,250,601 | Pancake | July 29, 1941 |